(12) United States Patent
Byun et al.

(10) Patent No.: US 9,920,556 B2
(45) Date of Patent: Mar. 20, 2018

(54) APPARATUS FOR OPENING AND CLOSING TAILGATE FOR VEHICLE

(71) Applicant: Hyundai Motor Company, Seoul (KR)

(72) Inventors: Min Hyung Byun, Seoul (KR); Dong Wuk Choi, Yongin-Si (KR); Hyun Woo Kim, Suwon-Si (KR)

(73) Assignee: Hyundai Motor Company, Seoul (KR)

( * ) Notice: Subject to any disclaimer, the term of this patent is extended or adjusted under 35 U.S.C. 154(b) by 163 days.

(21) Appl. No.: 14/956,032

(22) Filed: Dec. 1, 2015

(65) Prior Publication Data
US 2016/0281400 A1    Sep. 29, 2016

(30) Foreign Application Priority Data

Mar. 27, 2015 (KR) .......................... 10-2015-0043505

(51) Int. Cl.
| | |
|---|---|
| *E05C 19/10* | (2006.01) |
| *E05B 79/20* | (2014.01) |
| *E05B 81/06* | (2014.01) |
| *E05B 81/20* | (2014.01) |
| *E05B 81/38* | (2014.01) |
| *E05B 83/18* | (2014.01) |
| *F16H 1/28* | (2006.01) |
| *E05B 81/14* | (2014.01) |

(52) U.S. Cl.
CPC .............. *E05B 79/20* (2013.01); *E05B 81/06* (2013.01); *E05B 81/20* (2013.01); *E05B 81/38* (2013.01); *E05B 83/18* (2013.01); *E05B 81/14* (2013.01); *F16H 1/28* (2013.01)

(58) Field of Classification Search
CPC .......... E05B 81/20; E05B 81/06; E05B 79/20; E05B 81/14; E05B 83/16; E05B 81/34; E05B 53/005; E05B 53/008; E05B 81/38; Y10T 292/1082; Y10S 292/43; Y10S 292/29; E05Y 2900/546; E05Y 2201/434
See application file for complete search history.

(56) References Cited

U.S. PATENT DOCUMENTS

| | | | | |
|---|---|---|---|---|
| 6,123,372 | A | * | 9/2000 | Rogers, Jr. .............. E05B 81/20 292/201 |
| 6,676,556 | B2 | | 1/2004 | Ishihara et al. |
| 2005/0039404 | A1 | * | 2/2005 | Mrkovic ............... E05F 15/603 49/360 |

FOREIGN PATENT DOCUMENTS

| | | |
|---|---|---|
| JP | 2002-250165 A | 9/2002 |
| JP | 2007-138530 A | 6/2007 |
| JP | 2012-7319 A | 1/2012 |
| JP | 2014-9477 A | 1/2014 |
| KR | 10-0654066 B1 | 11/2006 |

(Continued)

*Primary Examiner* — Mark A Williams
(74) *Attorney, Agent, or Firm* — Morgan, Lewis & Bockius LLP

(57) ABSTRACT

An apparatus for opening and closing a tailgate for a vehicle includes a latch device provided in the tailgate and an actuator. The latch device includes a claw to engage with a striker provided at a vehicle body side, a pawl to engage with the claw to maintain the claw in a locked position, and an unlocking lever to operate the pawl to unlock the claw. The actuator includes a cinching/release lever to selectively operate a cinching cable connected to the claw to rotate the claw from an unlocked position to the locked position, and a release cable connected to the unlocking lever to operate the claw from the locked position to the unlocked position.

6 Claims, 5 Drawing Sheets

(56) References Cited

FOREIGN PATENT DOCUMENTS

KR         10-1281793 B1    6/2013
KR   10-2013-0097291 A    9/2013

\* cited by examiner

APPARATUS FOR OPENING AND CLOSING TAILGATE FOR VEHICLE

CROSS-REFERENCE TO RELATED APPLICATION

The present application claims priority of Korean Patent Application Number 10-2015-0043505 filed on Mar. 27, 2015, the entire contents of which application are incorporated herein for all purposes by this reference.

BACKGROUND

Technical Field

The present invention relates to an apparatus for opening and closing a tailgate for a vehicle. More particularly, it relates to an apparatus for opening and closing a tailgate for a vehicle, which has a simplified and improved structure so as to allow a latch to engage with a striker by operating a cinching cable by using a single motor, and/or to allow the latch to disengage from the striker by operating a release lever by operating a release cable.

Background Art

A trunk for a vehicle or a tailgate for a SUV is closed when a latch engages with a striker provided at a vehicle body side by a motor, or opened when a release lever is operated and the latch disengages from the striker.

As an example of this technology, Korean Patent No. 10-0654066 (issued on Nov. 29, 2006) discloses an electric structure for releasing a tailgate latch for a vehicle, which is installed in the tailgate latch for a vehicle, and forcedly switches a pawl that restricts a latch gear by an operation of an actuator, thereby releasing the striker by switching the latch gear.

U.S. Pat. No. 6,676,556 (issued on Jan. 13, 2014) discloses a motor device for actuating a vehicle door operation device and a vehicle door closer device. The device includes an output shaft connected to a latch operation device that operates a latch having an engagement-disengagement block. The block may engage with one of the gears that constitute a part of a planetary gear device, and a motor which generates rotational torque.

As an example of an apparatus for opening and closing a trunk or a tailgate in the related art, Korean Patent No. 10-1326535 (issued on Nov. 1, 2013), as schematically illustrated in FIG. 1, discloses a cinching latch assembly for a tailgate, in which a release actuator 1 is mounted on a latch device 2, and a separate cinching actuator 3 is connected by a cable 4, such that a latch is unlocked from a striker (not illustrated in the drawing) of a vehicle body by the release actuator 1 in order to open the tailgate in a closed state, and in order to completely close the tailgate (not illustrated) in a state in which the latch in the latch device 2 for a tailgate performs a half turn in a first step and engages with the striker, the cable 4 is pulled by the cinching actuator 3 so that the latch of the latch device completely engages with the striker in a second step.

The cinching actuator serves to prevent an accident that may occur when the tailgate is opened while the vehicle travels at a high speed in a case in which a user such as a female or an old or weak person, who does not have sufficient strength, operates the tailgate, and the tailgated is locked in a state in which the striker is not fully locked to a full latching state because of insufficient force to close the tailgate.

Because the release actuator and the cinching actuator need to be separately provided to open and close the tailgate in the related art, it was necessary to improve a structure in order to reduce manufacturing costs. In addition, a gear structure for a cinching actuator in the related art has a structure that just increases a driving gear ratio of a worm gear, and as a result, a size of a driving gear needs to be increased to produce higher force by using the motor. However, the increase in size of the driving gear causes an increase in weight and size of the gear structure, and as a result, the sized of the driving gear cannot be increased because of a limited and narrow space between the tailgate and an inner trim. Therefore, it is necessary to improve a structure of the actuator that may be installed at a limited location between the tailgate and the inner trim, and may obtain increased output.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

The present invention has been made in an effort to solve the above-described problems associated with the prior art and/or other problems, and to provide an apparatus for opening and closing a tailgate for a vehicle, which is improved to open and close the tailgate by selectively operating a cinching/release lever, in which ends of a cinching cable and a release cable are connected to a carrier provided in a planetary gear device that is operated by a single motor and has an increased gear ratio.

In one aspect, the present invention provides an apparatus for opening and closing a tailgate for a vehicle, including: a latch device provided in the tailgate, the latch device including: a claw to engage with a striker provided at a vehicle body side, a pawl to engage with the claw to maintain the claw in a locked position, and an unlocking lever to operate the pawl to unlock the claw; and an actuator including a cinching/release lever to selectively operate a cinching cable connected to the claw to rotate the claw from an unlocked position to the locked position, and a release cable connected to the unlocking lever to operate the claw from the locked position to the unlocked position.

In a preferred embodiment, the actuator may include a gear apparatus operated by a single motor to rotate in a forward or reverse direction, wherein the cinching/release lever selectively pulls the cinching cable or the release cable in accord with the rotation direction of the gear apparatus to lock or unlock the latch device.

In another preferred embodiment, the cinching/release lever may include slots formed at upper and lower sides of the cinching/release lever and in a substantially circular arc shape, an end of the cinching cable may be movably disposed in one of the slots, and an end of the release cable may be movably disposed in another one of the slots so that as the gear apparatus is rotated in the forward or reverse direction, the cinching/release lever selectively pulls the cinching cable or the release cable.

In still another preferred embodiment, the actuator may include a housing, and the gear apparatus may be installed in the housing to operate the cinching/release lever and include a planetary gear device, a motor operating the planetary gear device, and a worm gear provided on a output shaft of the motor.

In yet another preferred embodiment, the planetary gear device may include: a sun gear which has gear teeth formed on a cylindrical outer circumferential surface thereof, engages with the worm gear of the motor, and rotates in the forward or reverse direction; a ring gear which is coupled inside the sun gear to rotate together with the sun gear, and has gear teeth formed on an inner circumferential surface thereof; and planet gears which are disposed between upper and lower carrier members rotatably installed to a shaft inside an internal space of the ring gear, and mesh with the ring gear. The sun gear and the planet gears of the planetary gear device may have gear ratios that provide force to close the tailgate by using the single motor.

In still yet another preferred embodiment, the cinching/release lever may be coupled to the shaft above the upper carrier member of the planetary gear device and rotated in the forward or reverse direction together with the shaft.

According to the apparatus for opening and closing a tailgate for a vehicle, planet gears are operated in a state in which a ring gear is integrated into the inside of a planetary gear device which engages with a worm gear outside, thereby making the apparatus compact, and increasing torque by using a high gear ratio, a cinching cable and a release cable may be connected to slots formed at upper and lower sides of a cinching/release lever, in which a cinching lever and a release lever are integrated into a carrier of the planetary gear that is operated by a single motor, and the cinching cable and the release cable may be selectively operated, such that in comparison with a case in which respective actuators need to be provided to operate the cinching lever and the release lever in the related art, the apparatus has a structure that is light in weight and compact, manufacturing costs for the apparatus are reduced, and convenience in use is improved when a driver opens and closes the tailgate.

Other aspects and preferred embodiments of the invention are discussed infra.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles, e.g., fuel derived from resources other than petroleum. As referred to herein, a hybrid vehicle is a vehicle that has two or more sources of power, for example, both gasoline-powered and electric-powered vehicles.

The above and other features of the invention are discussed infra.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein.

Figure 1:
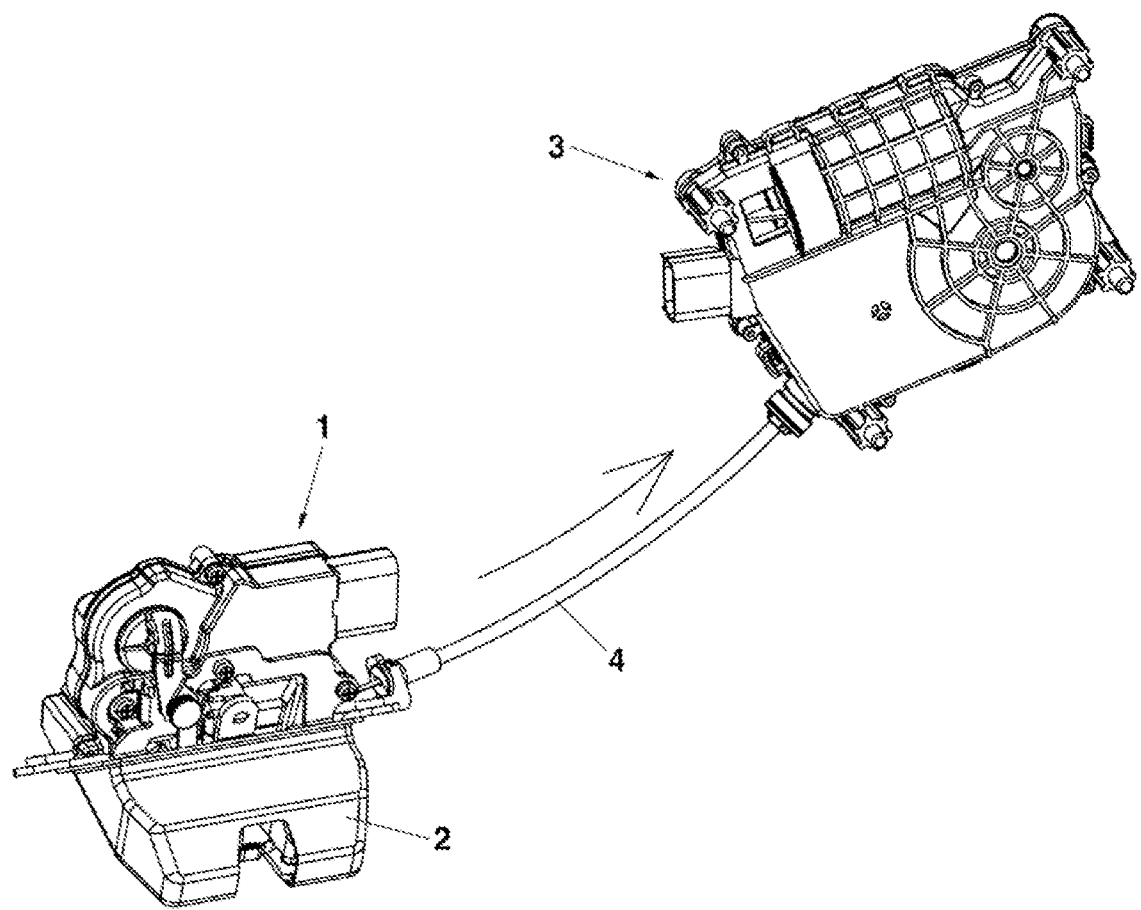
FIG. 1 is a schematic view illustrating an apparatus for opening and closing a tailgate, which has a release actuator and a cinching actuator for the tailgate in the related art.

Reference numerals set forth in the Drawings include reference to the following elements as further discussed below:

| | |
|---|---|
| 10: latch device | 20: actuator |
| 23: housing | 30: planetary gear device |
| 31: motor | 32: worm gear |
| 35: sun gear | 36: ring gear |
| 37: shaft | 38: carrier member |
| 39: planet gear | 40: cinching/release lever |
| 41, 42: slot | 43: cinching cable |
| 44: release cable | 47: circuit board |
| 51: claw | 52: pawl |
| 55: unlocking lever | |

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 2:
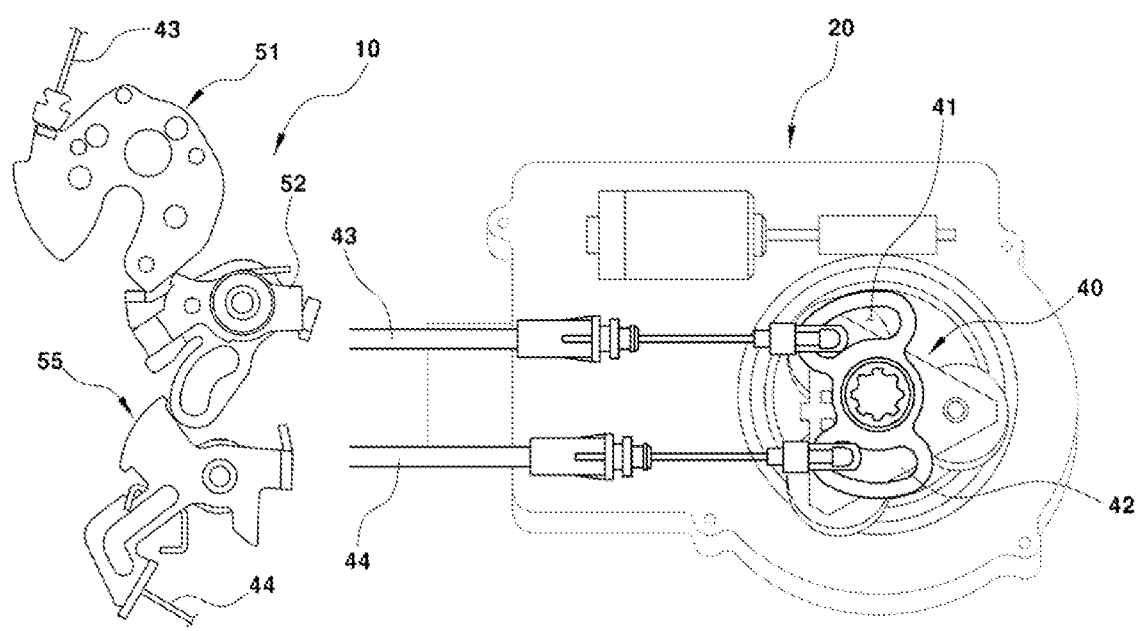
FIG. 2 is a schematic view illustrating an exemplary apparatus for opening and closing a tailgate according to the present invention, in which a single actuator operates a cinching cable and a release cable.

Referring to FIG. 2, an exemplary apparatus for opening and closing a tailgate for a vehicle according to some embodiments of the present invention includes a latch device 10, and an actuator 20 which selectively operates a cinching cable for pulling a claw, which engages with a striker that is provided at a vehicle body side of the latch device, so that the claw is rotated from a locked position to an unlocked position, and a release cable for rotating the claw from the unlocked position to the locked position.

Figure 3:
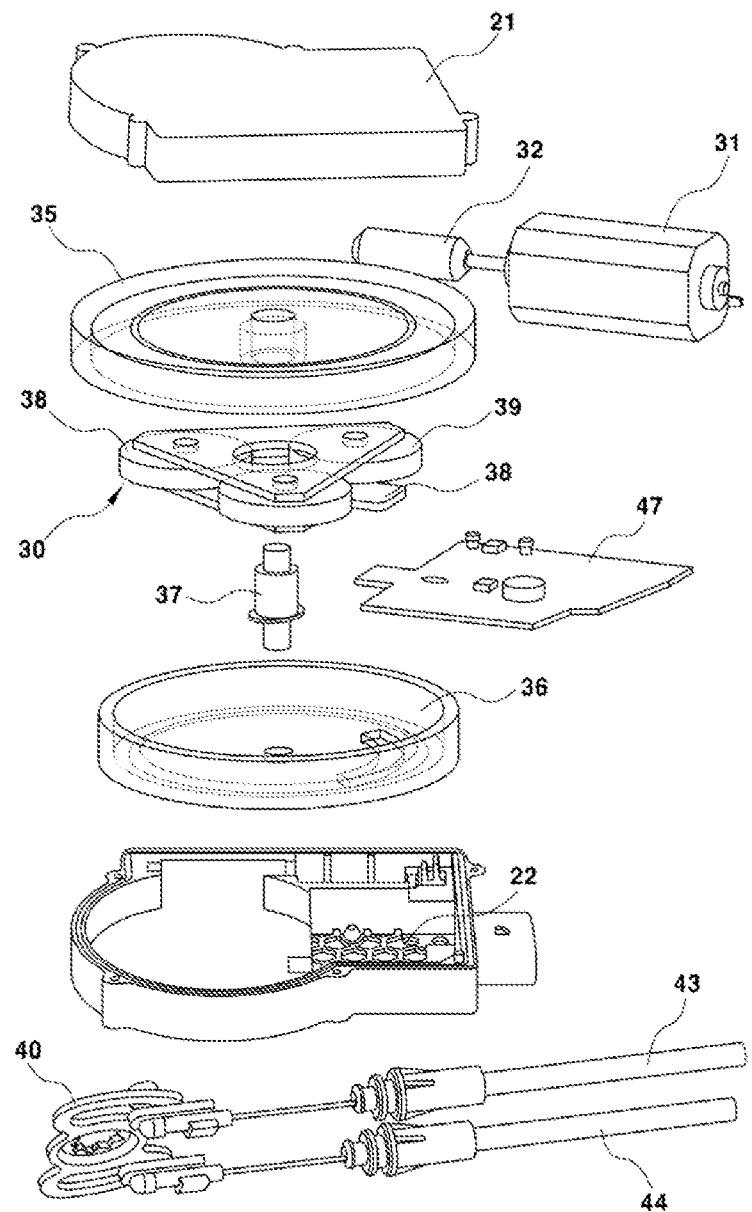
FIG. 3 is a schematic exploded perspective view of the actuator in FIG. 2.
Figure 4:
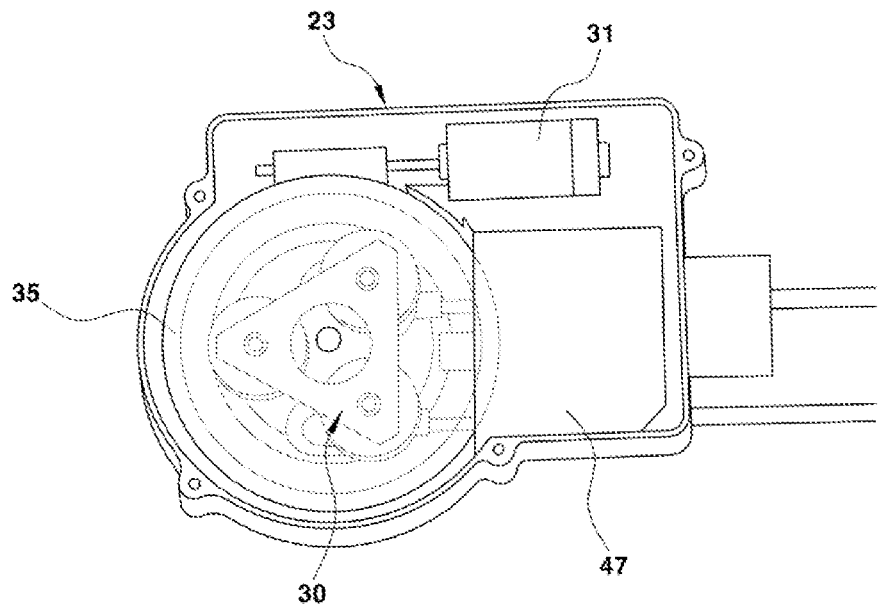
FIG. 4 is a perspective view of the actuator, in which a cover in FIG. 2 is removed.

As illustrated in FIGS. 3 and 4, in some embodiments, the actuator 20 includes: a housing 23 which includes an upper housing 21 and a lower housing 22; a cinching/release lever 40 which is installed in the housing 23 and connected with the cinching cable and the release cable; and a gear apparatus which operates the cinching/release lever and includes a planetary gear device 30, a motor 31 which operates the planetary gear device, and a worm gear 32 which is provided on an output shaft of the motor 31.

The planetary gear device 30 includes: a sun gear 35 which has gear teeth formed on a cylindrical outer circumferential surface thereof, engages with the worm gear of the motor, and rotates; a ring gear 36 which is coupled inside the sun gear to rotate together with the sun gear, and has gear teeth formed on an inner circumferential surface thereof; and planet gears 39 which are disposed between upper and lower carrier members 38, which are rotatably installed to a shaft 37 inside an internal space of the ring gear and have a triangular shape, corresponding to vertices the triangular shape of the upper and lower carrier members 38, and mesh with the ring gear 36. The sun gear, the ring gear, and the planet gears of the planetary gear device may have gear ratios that may exhibit force enough to close the tailgate by using the single motor.

The cinching/release lever 40 is coupled to the shaft 37 above the upper carrier member 38 of the planetary gear device, and the cinching/release lever 40 is rotated in forward and reverse directions together with the shaft 37 through the planetary gear device 30 when the worm gear 32 is rotated in the forward and reverse directions by the motor 31.

Figure 5:
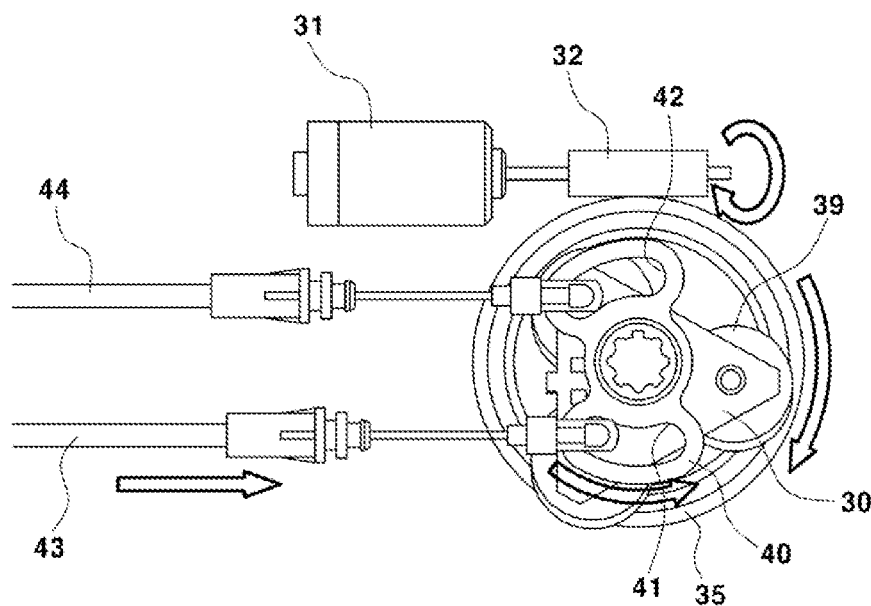
FIG. 5 is a view for explaining an operation of closing the tailgate by using the actuator in FIG. 2.
Figure 6:
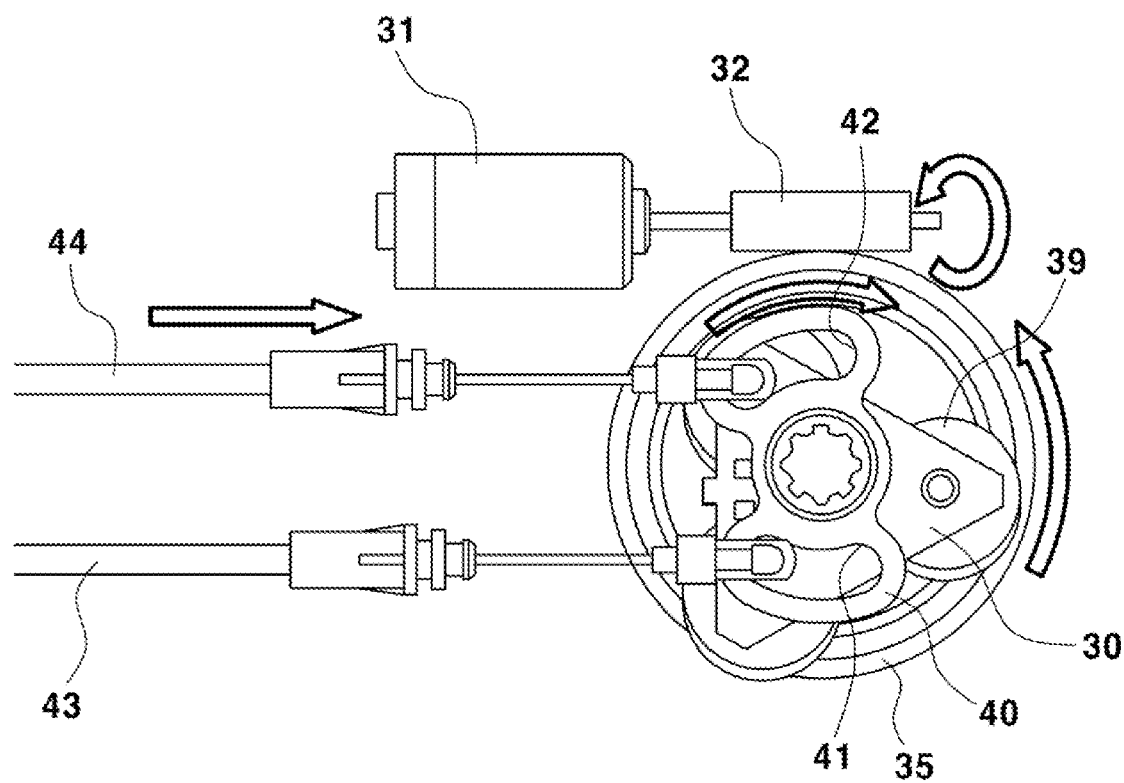
FIG. 6 is a view for explaining an operation of opening the tailgate by using the actuator in FIG. 2.

As illustrated in FIGS. 5 and 6, the cinching/release lever 40 has slots 41 and 42 that are formed at upper and lower sides of the cinching/release lever 40 and have a arc shape, and in some embodiments have a circular or substantially circular arc shape. An end of the cinching cable 43 is provided to be movable in the slot 41, and an end of the release cable 44 is disposed to be movable in the slot 42, such that as the cinching/release lever 40 is rotated in the forward and reverse directions, the cinching cable 43 and the release cable 44 are selectively pulled.

When the worm gear 32 is rotated in the forward direction by the motor 31, the sun gear 35 is rotated clockwise, the planet gears 38, which engage with the ring gear 36 inside the sun gear 35, are rotated counterclockwise, and the cinching/release lever 40, which is coupled to the shaft 37 above the carrier member 38, is rotated counterclockwise, such that the end of the cinching cable 43 is caught by a left end in the slot 41 based on the drawing and pulled, and the end of the release cable 44 is moved in the slot 42 to the right side based on the drawing when the cinching/release lever is rotated clockwise and maintained eventually without receiving force.

When the worm gear 32 is rotated in the reverse direction by the motor 31, the sun gear 35 is rotated counterclockwise, the planet gears 39, which engage with the ring gear 36 inside the sun gear 35, are rotated clockwise, and the cinching/release lever 40, which is coupled to the shaft 37 above the carrier member 38, is rotated counterclockwise, such that the release cable caught by the left end in the slot 42 is pulled, and the cinching cable in the slot 41 is moved in the slot 41 to the right side based on the drawing and maintained without receiving force.

In some embodiments, a circuit board 47, which has an ECU that controls the motor 31 in response to a signal that is produced when a driver operates a switch for opening and closing the tailgate, is provided in the housing 23 of the actuator 20.

An operation of the latch device according to an operation of the actuator will be described with reference to FIGS. 2, 5 and 6.

In some embodiments, the latch device 10 includes: a claw 51 which is rotated between a locked position at which the claw 51 engages with the striker by a pulling operation of the cinching cable 43 and an unlocked position at which the claw 51 disengages from the strike; a pawl 52 which engages with the claw 51 to maintain the claw 51 to the locked position, and allows the claw 51 to be rotated from the locked position to the unlocked position when the pawl 52 is rotated; and an unlocking lever 55 which strikes the pawl while being rotated by being pulled by the release cable to allow the pawl to disengage from the claw 51, and allows the claw 51 to be unlocked from the striker by elastic force of a return spring.

When the driver pushes the switch in order to close the tailgate, the motor of the actuator receives a signal from the switch and is rotated in the forward direction under the control of the ECU of the circuit board 47, the worm gear and the sun gear engaging with the worm gear are rotated clockwise in the forward direction as described above, the planet gears, which engage with the ring gear inside the sun gear, and the carrier member are rotated in the reverse direction, and the cinching/release lever 40 is rotated counterclockwise, such that the cinching cable 43 engaging with the end of the slot 41 is pulled, and the claw 51 connected to the cinching cable 43 is rotated clockwise and locked while engaging with the striker. In this case, the pawl 52 engages with a lower surface of the claw 51 to prevent the claw 51 from being rotated counterclockwise in a direction in which the claw 51 disengages, thereby maintaining a locked state.

When the driver pushes a switch for opening the tailgate, the motor of the actuator is rotated in the reverse direction in response to a signal from the switch under the control of the ECU of the circuit board 47, the worm gear and the sun gear are rotated in the reverse direction, the planet gears, which engage with the ring gear inside the sun gear, and the carrier member are rotated in the forward direction, the cinching/release lever 40 is rotated clockwise, the release cable 43 in contact with the end of the slot 42 is pulled, and the unlocking lever 55 connected to the release cable is rotated counterclockwise and strikes the pawl 52 to allow the pawl 52 to be rotated clockwise so that the pawl 52 disengages from the claw, such that the claw 51 is rotated counterclockwise by elastic force of the return spring and disengages from the striker.

As described above, according to some embodiments of the present invention, the planetary gear device 30 is operated by the single motor 31 of the single actuator 20, the cinching/release lever 40 provided at the carrier member 38 of the planetary gear device is rotated in the forward and reverse directions, the cinching cable 43 and the release cable 44, which are provided in the slots 41 and 42 that are formed at the upper and lower sides of the cinching/release lever, are selectively operated, thereby locking the tailgate by allowing the claw of the latch device of the tailgate to engage with the striker at the vehicle body side, or opening the tailgate by allowing the claw to disengage from the striker.

The present invention may be used to reduce the number of components of the apparatus for opening and closing a tailgate, which opens and close the tailgate for a vehicle by using the motor, make the apparatus compact, reduce a weight of the apparatus, and reduce manufacturing costs for the apparatus.

For convenience in explanation and accurate definition in the appended claims, the terms "upper" or "lower", "left" or "right", "forward" or "reverse", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An apparatus for opening and closing a tailgate for a vehicle, the apparatus comprising:
   a latch device provided in the tailgate, the latch device including:
      a claw to engage with a striker provided at a vehicle body side,
      a pawl to engage with the claw to maintain the claw in a locked position, and
      an unlocking lever to operate the pawl configured to unlock the claw engaged with the pawl; and
   an actuator including a cinching/release lever to selectively operate a cinching cable and a release cable, the cinching cable being connected to the claw to rotate the claw from an unlocked position to the locked position, and the release cable being connected to the unlocking lever to operate the claw from the locked position to the unlocked position,
   wherein the cinching/release lever includes slots formed at upper and lower sides of the cinching/release lever and in a substantially circular arc shape, an end of the cinching cable is movably disposed in one of the slots, and an end of the release cable is movably disposed in another one of the slots so that as a gear apparatus is rotated in a forward direction or a reverse direction, the cinching/release lever selectively pulls the cinching cable or the release cable.

2. The apparatus of claim 1, wherein the actuator includes:
   the gear apparatus operated by a single motor to rotate in the forward direction or the reverse direction, wherein the cinching/release lever selectively pulls the cinching cable or the release cable in accord with a rotation direction of the gear apparatus to lock or unlock the latch device.

3. The apparatus of claim 2, wherein:
   the actuator includes a housing,
   the gear apparatus is installed in the housing and operates the cinching/release lever,
   the gear apparatus includes a planetary gear device, the single motor operating the planetary gear device, and a worm gear provided on an output shaft of the single motor.

4. The apparatus of claim 3, wherein the planetary gear device includes:
   a sun gear which has gear teeth formed on a cylindrical outer circumferential surface thereof, engages with the worm gear of the motor, and rotates in the forward direction or the reverse direction;
   a ring gear which is coupled inside the sun gear to rotate together with the sun gear, and has gear teeth formed on an inner circumferential surface thereof; and
   planet gears which are disposed between upper and lower carrier members rotatably installed to a shaft inside an internal space of the ring gear, and mesh with the ring gear.

5. The apparatus of claim 4, wherein the sun gear and the planet gears of the planetary gear device have gear ratios that provide force to close the tailgate by using the single motor.

6. The apparatus of claim 4, wherein the cinching/release lever is coupled to the shaft above the upper carrier member of the planetary gear device and rotated in the forward direction or the reverse direction together with the shaft.

* * * * *